April 29, 1952 — A. DUGUAY — 2,595,129
GRIPPING DEVICE
Filed May 20, 1946 — 2 SHEETS—SHEET 1

INVENTOR.
Alphonse Duguay.
BY Harness, Dickey & Pierce.
ATTORNEYS.

April 29, 1952 — A. DUGUAY — 2,595,129
GRIPPING DEVICE
Filed May 20, 1946 — 2 SHEETS—SHEET 2
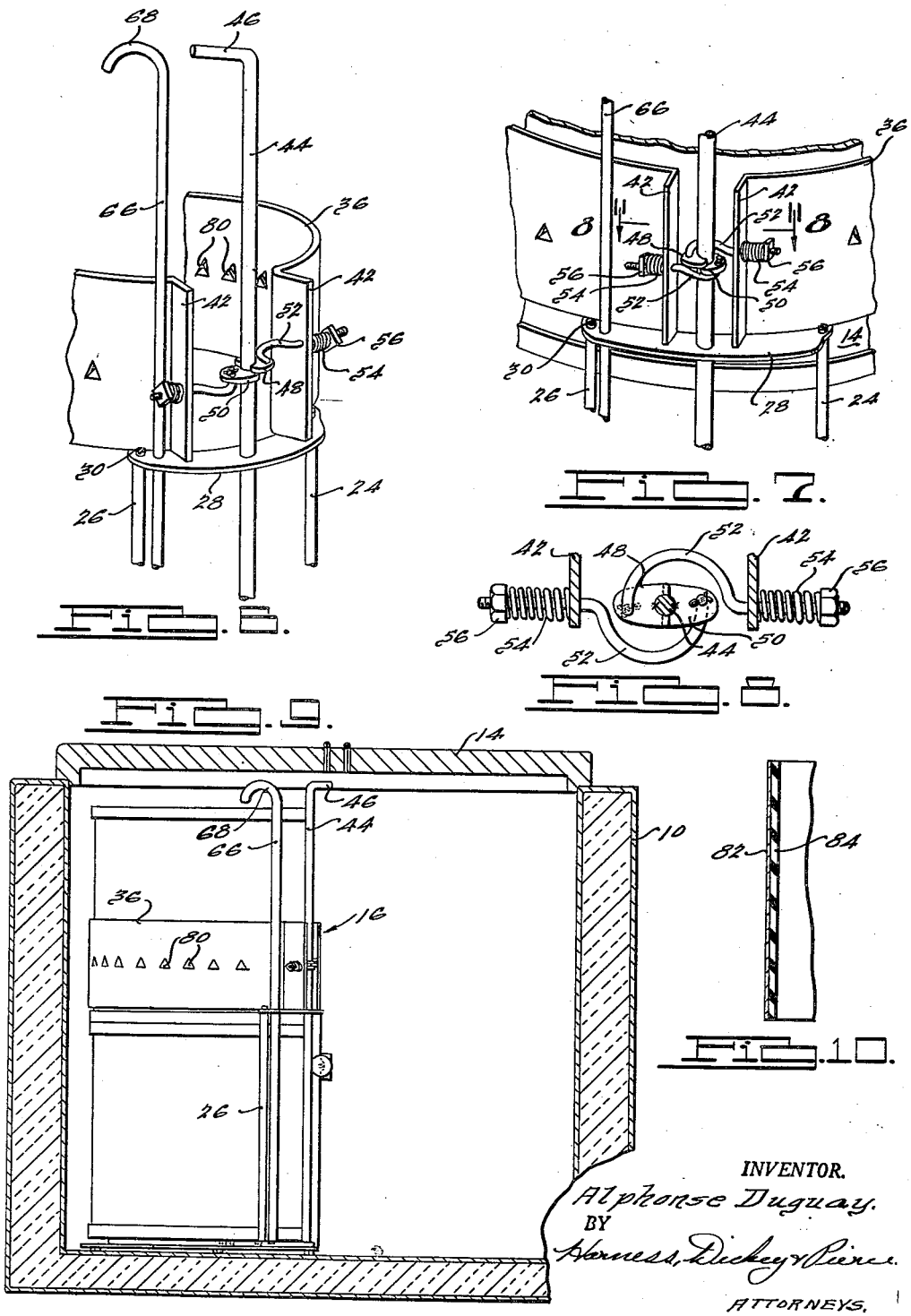
INVENTOR.
Alphonse Duguay.
BY
Harness, Dickey & Pierce.
ATTORNEYS.

Patented Apr. 29, 1952

2,595,129

UNITED STATES PATENT OFFICE 2,595,129

GRIPPING DEVICE

Alphonse Duguay, St. Clair Shores, Mich.

Application May 20, 1946, Serial No. 671,114

5 Claims. (Cl. 248—361)

This invention relates to container supporting means, and more particularly to an improved container supporting device having gripping means of particular usefulness in ice cream cabinets for supporting ice cream containers in a desired position.

It is customary to ship ice cream in two and one-half gallon or five gallon cylindrical containers and to maintain the ice cream in frozen condition in conventional ice cream cabinets. The chambers of such cabinets are of a depth to receive one five gallon container or two two and one-half gallon containers, and are substantially wider than the containers which are free to turn or rotate in the cabinet. This turning of the container relative to the cabinet occurs during the operation of removing the ice cream from the container as a result of the pressure required to dip the scoop or other utensil into the ice cream, which greatly increases the difficulty in dispensing the ice cream.

When two and one-half gallon containers are used, two are usually placed in the cabinet, one on top of the other. When the upper container is emptied, it must be removed and then either the ice cream must be removed from the lower container while it is on the bottom of the cabinet or it must be removed and the empty container placed below it to raise it to the top of the chamber where it can be more readily reached.

Accordingly, the principal objects of the present invention are: to provide an improved container supporting device which may be received within a chamber of an ice cream cabinet and which is adapted to support and releasably hold an ice cream container in a desired position in the cabinet in a manner to prevent it from rotating when the ice cream is being dispensed; to provide a container supporting device of the above generally indicated type which is simple in arrangement, economical of manufacture and assembly and which is reliable and efficient in operation; to provide an improved device having two complementary parts which may be secured together and either of which is adapted to support an ice cream container and releasably grip and hold it in a desired position; to provide an improved gripping device for supporting an ice cream container in the chamber of an ice cream cabinet having means associated therewith for lifting a container from the bottom of the cabinet to the desired position in which it is to be held; and to generally improve the construction and operation of supporting devices of the above generally indicated type.

With the above and other objects in view, which will be apparent from the following description and the appended claims, preferred but illustrative embodiments of the invention are shown in the accompanying drawings throughout the several views of which corresponding reference characters are used to designate corresponding parts, and wherein:

Fig. 6 is a partial view in perspective showing a gripping device of the present invention in the released position;

Fig. 7 is a partial view in perspective showing the gripping device of Fig. 6 in the clamped position;

Fig. 8 is a partial sectional view of the structure of Fig. 7, taken substantially along the line 8—8 thereof;

Fig. 9 is a view in elevation showing one part of the container supporting device of the present invention mounted in the chamber of an ice cream cabinet, which is shown in section; and Fig. 10 is a fragmentary sectional view of another form of the invention.

Figure 1:
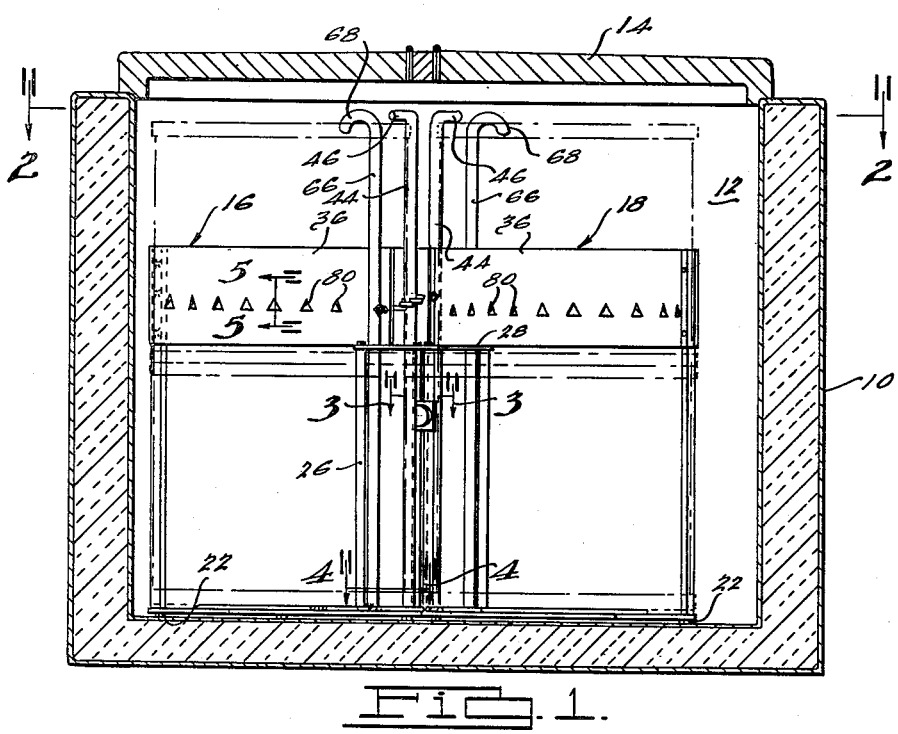
Figure 1 is an elevational view showing a container supporting device constructed according to the present invention installed in an ice cream cabinet, which is shown in section.
Figure 2:
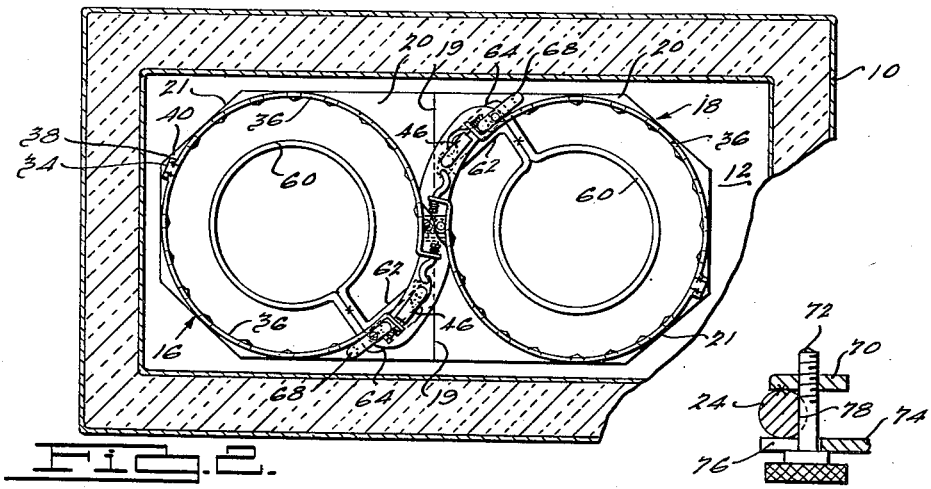
Fig. 2 is a sectional view of the structure of Fig. 1, taken substantially along the line 2—2 thereof.

Referring to the drawings, and in particular to Figs. 1 and 2 thereof, the container supporting device of the present invention is adapted for use in a conventional ice cream cabinet 10 having a chamber 12 formed therein and a cover 14 adapted to close the opening at the top of said chamber. The container supporting device comprises two complementary parts 16 and 18 adapted to be secured together by means hereinafter described. The complementary parts 16 and 18 differ only in the cooperating parts of the above-mentioned securing means which are carried thereby, and each of said parts may be used separately, as illustrated in Fig. 9, when it is desired to fill the other part of the cabinet 10 with packaged ice cream, frozen foods or the like.

Each of the complementary parts 16 and 18 comprises a generally rectangularly shaped base plate 20, one end 19 of which abuts the corresponding end of the base plate of the other of the parts when the two parts 16 and 18 are secured together. The opposite end of the base plate has the corners cut off, as shown at 21 in Fig. 2, to facilitate insertion of the container supporting device into the ice cream cabinet 10 and to reduce the space occupied thereby. The base plate 20 is provided with a plurality of supporting buttons 22 formed of rubber or of other suitable material adapted to support the base plate 20 within the chamber 12 of the cabinet 10. The buttons 22 aid in preventing rotation of the base plate 20 relative to the cabinet 10 and prevent the base plate from being frozen to the bottom of the cabinet.

A vertically disposed rod 24 is mounted on said base plate 20 centrally of the end 19 and cooperates with a similar vertically disposed rod 26 mounted on said base plate adjacent to one side thereof and in spaced relation to the end 19 to support an arcuately shaped plate 28 secured to the upper ends thereof by screws 30. A third vertically disposed bar 34 is mounted on said base plate 20 at the other end thereof and in opposed relation to the rods 24 and 26. A gripping band is secured to the bar 34 adjacent to its upper end and comprises two substantially semicircular shaped bands 36 having outwardly turned flange portions 38 at one end thereof which are secured to the bar 34 by bolts 40. At their other end the semicircular bands 36 have outwardly extending flanges 42 formed thereupon which overlie and may be supported by the arcuately shaped plate 28 mounted on the rods 24 and 26.

A vertically disposed clamping rod 44 is rotatably mounted at its lower end on the base plate 20 intermediate the rods 24 and 26, and extends upwardly through the arcuately shaped plate 28 and between the outwardly turned flanges 42 formed on the bands 36. At its upper end, a portion of the clamping rod 44 is bent at an angle of 90° to provide a handle 46 for rotating the rod to clamped and unclamped positions. Adjacent to and intermediate the outwardly turned flanges 42, the rod 44 has oppositely extending lever arms 48 and 50 secured thereto. The arms 48 and 50 are vertically offset one from another to facilitate their welding to the rod 44. These lever arms 48 and 50 are connected to the outwardly extending flanges 42 by tie rods 52, having one end thereof hooked through vertical apertures formed in the lever arms 48 and 50 and the other end thereof extending through an aperture in the flanges 42 and receiving a spring 54 and a threaded nut 56. The portion of the tie rod 52 intermediate the lever and the flange 42 is curved, as is clearly illustrated in Fig. 8, to permit the rod 44 to be rotated to a clamped position in which the connection between the tie rods 52 and their associated lever arms is such that the lever arms are in an over-toggle position, that is, one in which they have passed over the axis of pull between the flanges 42 to a position in which the resultant force on the connection between the tie rods 52 and their asociated lever arms acts to maintain the lever arms in a clamped position, as illustrated in Fig. 7, rather than to urge them to the released or unclamped position, as illustrated in Fig. 6.

It will be appreciated that when the handle 46 is rotated in a counterclockwise direction from the unclamped position illustrated in Fig. 6, the lever arms 48 and 50 secured to the rod 44 will be similarly rotated, and the flanges 42 will be drawn toward each other by the action of the tie rods 52, thus drawing the gripping bands 36 to the clamped position.

The clamping force to be exerted by the gripping device upon the ice cream container, which is shown in broken lines in Fig. 1, may be controlled by varying the pressure of the springs 54 by adjusting the nuts 56 on the tie rods 52.

Each of the complementary parts 16 and 18 of the container supporting device is proportioned to support either one large container, such as the conventional five gallon ice cream container or the topmost of the two smaller containers, such as the conventional two and one-half gallon ice cream containers, when disposed one above the other. Each of the parts is also provided with lifting means which is useful in removing the large containers and which has a particular utility in connection with the small containers for raising the lower of the small containers into position when the upper container has been emptied and removed.

Figures 3, 4, 5:
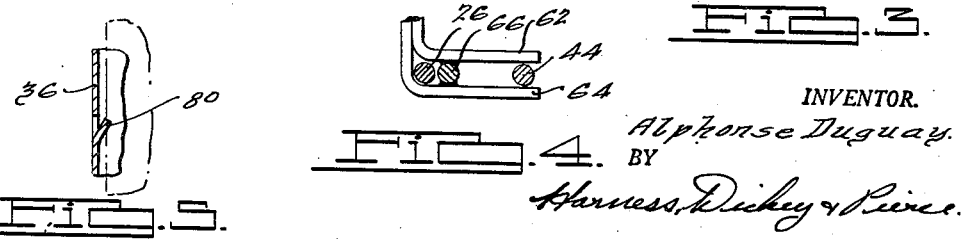
Fig. 3 is an enlarged fragmentary sectional view of the structure of Fig. 1, taken substantially along the line 3—3 thereof.
Fig. 4 is an enlarged fragmentary sectional view of the structure illustrated in Fig. 1, taken substantially along the line 4—4 thereof.
Fig. 5 is a fragmentary sectional view of the structure shown in Fig. 1, taken substantially along the line 5—5 thereof.

This lifting means comprises a rod 60 having a circular portion which normally rests on the base plate 20 and underlies the container or containers held in the supporting device. Referring to Fig. 4, the two ends of the rod 60 are shaped to form portions extending radially of said circular portion and outer end portions which are deformed at right angles to said radial portions to form spaced parallel arms 62 and 64 for receiving the lower ends of the rods 26 and 44 therebetween. A lifting rod 66 is disposed adjacent to the rod 26 and has its lower end received between and welded to the arms 62 and 64 and extends upwardly through the plate 28 and terminates at its upper end in a reversely bent portion, affording a handle 68. The radially extending portions of the rod 60 are welded together for increased strength. The lifting means is guided in its vertical movement by the engagement of the arms 62 and 64 with the rods 26 and 44.

For securing complementary parts 16 and 18 together, the rod 24 of the part 16 carries a bracket 70 through which a horizontally disposed thumb screw 72 is threaded. The rod 24 of the complementary part 18 mounts a bracket 74 having a slot 76 adapted to receive the shank of the thumb screw 72. When the two parts 16 and 18 are placed in position to be secured together, with the base plates 20 in abutting relation, the bracket 74 is disposed between the head of the thumb screw 72 and the rod 24, with the shank of the thumb screw received in the slot 76. When the thumb screw is tightened, the bracket 74 is gripped and securely held between the head of the thumb screw and the rod 24 upon which the thumb screw is mounted. The rod 24 of the part 16 may be notched to receive the shank of the thumb screw, as shown at 78, so that it will not interfere with bringing the plates 20 into abutting relationship when the two parts 16 and 18 are secured together.

The semicircular gripping bands 36 are specially adapted for use with ice cream containers of the type having paper side walls. As is most clearly seen in Fig. 5, the gripping bands 36 are provided with inwardly struck teeth 80 spaced about their center portions, which dig into the paper side walls to provide a positive hold on the container.

In a modified form of the invention illustrated in Fig. 10, the gripping bands 82 corresponding to the gripping bands 36, carry a lining 84 secured to the inner surface, formed of rubber coated webbing or other suitable material. Although the gripping band of this construction may be used with containers made of paper and like material, it has a particular utility in gripping containers made of metal and similar hard material with which the teeth 80 would be less effective.

It is to be understood that in a multi-chambered cabinet, each chamber may be provided with a container supporting device and although the device may be easily and quickly removed, it occupies so little space that when desired the chamber may be employed for storing small packages even though the container supporting device is not removed.

When paper containers are employed, they may be raised and cut off as the ice cream is used so as to keep the upper surface of the ice cream near the top of the cabinet and thus eliminate the long reach normally required as the ice cream is used from the container. For this purpose, a thread may be imbedded in the container walls which severs the wall at the line along which the thread is disposed, when the thread is pulled. Such threads may be placed at various heights so that several sections of the containers may be so severed.

What is claimed is:

1. A container supporting device including, in combination, a gripping band having ends spaced apart when in released position, means for supporting said band, a handle extending above said band, means interconnecting the handle with the spaced ends of the bands for moving the ends toward each other into gripping position and for locking the ends against separation thereafter, and container lifting means disposed below said band and having an operating handle spaced from said first handle and also extending above said band by which the containers are adjusted in elevation.

2. A gripping device disposable within an ice cream dispensing cabinet and adapted to rigidly hold an ice cream container in a desired position, said gripping device comprising a base plate, means mounted on said base plate adapted to engage said cabinet to prevent rotation of said gripping device, upright supporting means mounted on said base plate, a band mounted on said upright supporting means adapted to substantially surround said container intermediate its upper and lower ends near the upper part of the cabinet, said band having teeth formed inwardly thereof for gripping said container, and clamp means operable to positive locking position for releasably and rigidly clamping said band around said container.

3. A gripping device disposable within an ice cream dispensing cabinet and adapted to rigidly hold an ice cream container in a desired position, said gripping device comprising a base plate, means mounted on said base plate adapted to engage said cabinet to prevent rotation of said gripping device, supporting means mounted on said base plate, a band mounted on said supporting means adapted to substantially surround said container, and lifting means mounted on said supporting means operable to raise said container, said lifting means having its lower end disposed under said container and its upper end extending through said supporting means and provided with a handle.

4. A gripping device disposable within an ice cream dispensing cabinet and adapted to support two ice cream containers in vertical alignment and to rigidly hold the upper of said containers in a desired position, said gripping device comprising a base plate, means mounted on said base plate adapted to engage said cabinet to prevent rotation of said gripping device, supporting means mounted on said base plate, gripping means mounted on said supporting means for releasably and rigidly holding said upper of said containers, and lifting means mounted on said supporting means operable upon the removal of said upper of said containers for raising the lower of said containers into position to be gripped by said gripping means.

5. A gripping device disposable within an ice cream dispensing cabinet and adapted to support two ice cream containers in vertical alignment and to rigidly hold the upper of said containers in a desired position, said gripping device comprising a base plate, means mounted on said base plate adapted to engage said cabinet to prevent rotation of said gripping device, supporting means mounted on said base plate, gripping means mounted on said supporting means for releasably and rigidly holding said upper of said containers, and lifting means mounted on said supporting means operable upon the removal of said upper of said containers for raising the lower of said containers into position to be gripped by said gripping means, said lifting means having its lower end disposed under the bottom of said lower container and its upper end extending through said supporting means and provided with a handle.

ALPHONSE DUGUAY.

REFERENCES CITED

The following references are of record in the file of this patent:

UNITED STATES PATENTS

| Number | Name | Date |
| --- | --- | --- |
| 859,605 | Kirkbride | July 9, 1907 |
| 2,074,212 | Conner | Mar. 16, 1937 |
| 2,283,813 | Kreiling | May 19, 1942 |
| 2,292,310 | Wilkins | Aug. 4, 1942 |
| 2,295,609 | Shimon | Sept. 15, 1942 |
| 2,354,935 | Andrea | Aug. 1, 1944 |
| 2,363,256 | Manning | Nov. 21, 1944 |